Patented June 18, 1935

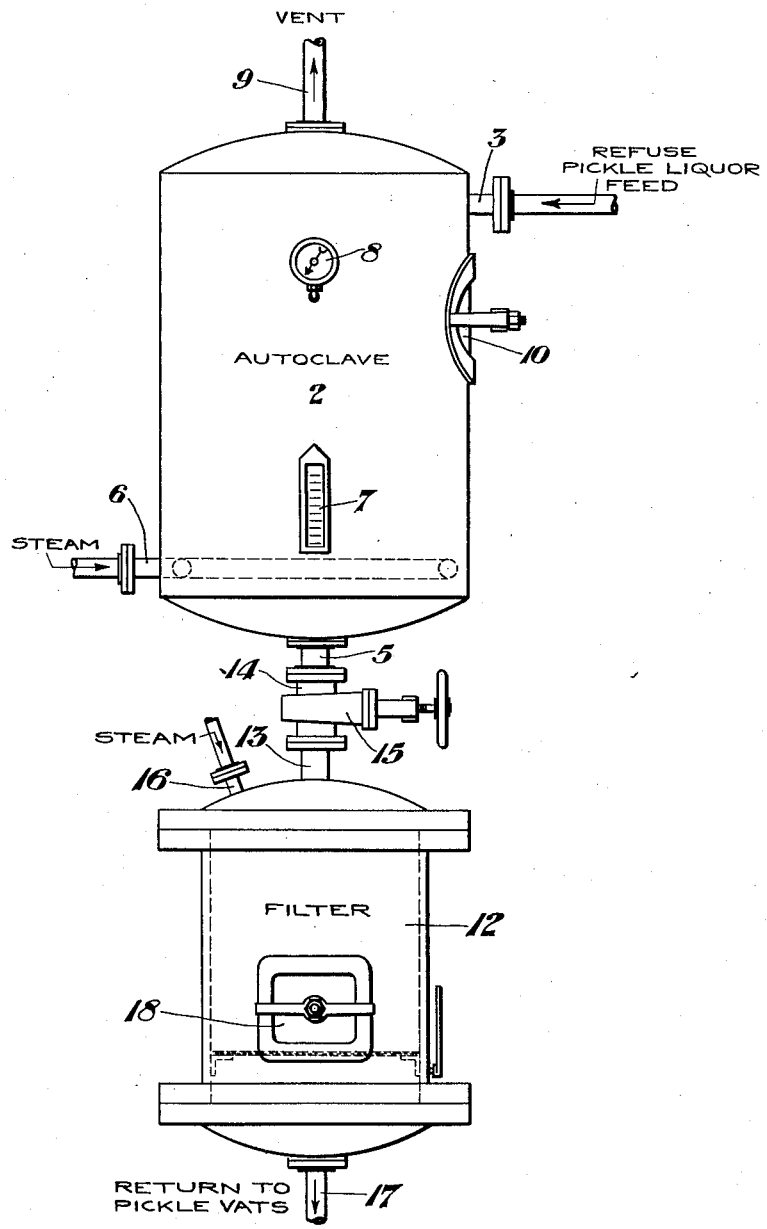

2,005,120

UNITED STATES PATENT OFFICE 2,005,120

METHOD OF RECOVERING SALTS AND OTHER COMPOUNDS

Joshua C. Whetzel and Rufus E. Zimmerman, Pittsburgh, Pa., assignors to American Sheet and Tin Plate Company, a corporation of New Jersey Application February 3, 1932, Serial No. 590,708

3 Claims. (Cl. 23—126)

This invention relates to the recovery of salts and other compounds, whose solubilities decrease with an increase in temperature above a predetermined point, and while not limited thereto relates more particularly to the recovery of ferrous sulfate monohydrate ($FeSO_4H_2O$) from waste pickle liquor and similar solutions.

Ferrous sulfate monohydrate is superior in many ways to the iron salts heretofore recovered, such as copperas or the heptahydrate of ferrous sulfate ($FeSO_47H_2O$). On account of the much smaller amount of water present in the monohydrate, it represents a more highly concentrated form of ferrous sulfate than copperas.

The relative amounts of ferrous sulfate and water present in monohydrate and copperas will be clear from the following compositions:

|  | Monohydrate ($FeSO_4H_2O$) | Copperas ($FeSO_47H_2O$) |
|---|---|---|
|  | Per cent | Per cent |
| Ferrous sulfate | 89.40 | 54.64 |
| Water | 10.60 | 45.36 |

Based on the above figures it will be apparent that one ton (2,000 lbs.) of monohydrate is equivalent in iron sulfate content to 1.64 tons (3,275 lbs.) of copperas. This increased iron sulfate content therefore provides a considerable saving in handling and transportation costs.

The monohydrate also has many other advantages over copperas; it is more readily burned to form iron oxid or rouge, it does not so readily fuse when heated, is more stable and is not so rapidly oxidized in the air, it is not hygroscopic and neither deliquesces nor effloresces under usual atmospheric conditions.

The monohydrate of this invention is readily recovered as a filter cake which is rather friable and easily crushed or broken.

Heretofore iron salts have generally been recovered by evaporation, which requires a relatively large amount of heat, while the present method uses only a small fraction of the quantity of heat necessary for evaporation.

The present method takes advantage of the fact that the solubility of ferrous sulfate in water decreases with increasing temperature within the temperature range in which the monohydrate salt is stable.

The temperature at which the monohydrate of ferrous sulfate becomes thermodynamically the stable hydrate is about 147° F. Below this temperature the higher hydrates are stable. Considerable superheating and supercooling are possible in actual practice. After the formation of the monohydrate the solubility of ferrous sulfate decreases rapidly with precipitation of the monohydrate of ferrous sulfate after saturation is reached, until between 300° F. and 400° F. its solubility is very low.

At least some of the salts and compounds whose solubilities decrease with an increase in temperature have an increase in solubility while the temperature is increasing through a low range. Therefore, it will be understood that reference throughout this specification to salts and compounds whose solubilities decrease with an increase in temperature is meant to include salts and compounds whose solubility decreases with a substantial increase in temperature over any range and from any point.

In carrying out the present method with waste pickle liquor it is therefore only necessary to raise the temperature of the liquor to about 350° F. and then remove the monohydrate by filtration or other means before allowing the liquor to cool. Other temperatures may be used, depending upon the recovery desired, liquor concentrations and the equipment available.

The process must be carried out under pressure since the temperature to which the liquor is raised is above the boiling point of the solution.

It is important that the solution to be treated has sufficient free acid content to avoid trouble from the hydrolysis of the iron sulfate, and while waste pickle liquor that has not been "killed", or neutralized, will have this quantity of free acid, it will be necessary when treating other iron sulfate solutions to provide such free acid content before treating them, otherwise trouble will be experienced with hydrolysis of the ferrous sulfate. A free acid content of about 0.5 per cent. has been found suitable in some cases.

The inherent advantages of the monohydrate recovery process of this invention will be readily apparent from the above. The heat consumption is only a fraction of that required by any evaporation process for the recovery of iron salts, particularly over spray drying, where all the water must be evaporated. Heat interchangers and other accessories may be more readily applied to the superheated solutions used in the present method or process than to the vapors or gases of other processes. The present process also produces a uniformly pure clean product.

Another important advantage of the present method is that the liquid discharged after the monohydrate has been filtered out may be returned to the pickling vats or tanks for reuse, so that no acid is lost and stream pollution is eliminated.

While we have specifically described one method as applied to the recovery of ferrous sulfate monohydrate ($FeSO_4H_2O$) from waste pickle liquor it will be understood that it may also be used in the treatment of other sulfate solutions for the recovery of other salts and compounds whose solubilities decrease with an increase in temperature, such as manganese sulfate monohydrate ($MnSO_4H_2O$), cerium sulfate tetrahydrate ($Ce_2(SO_4)_3.(4H_2O)$), and thorium sulfate tetrahydrate ($Th(SO_4)_2.(4H_2O)$).

One form of apparatus for carrying out the method of this invention, which has proven successful in plant operation, is illustrated in the accompanying drawing.

Referring now to the drawing, the numeral 2 designates an autoclave in which the solution to be treated is heated. The autoclave is provided with a solution inlet 3 adjacent its upper end, and an outlet 5 in its bottom. A steam inlet 6 is provided adjacent its lower end through which live steam is admitted for the purpose of heating the solution. A suitable thermometer 7 is provided by which the temperature of the solution may be readily determined, and a pressure gage 8 is provided by which the pressure in the autoclave may be determined. A vent 9 is provided in the upper end of the vessel. A suitable manhole having a removable cover 10 is provided by which access may be had to the interior of the apparatus.

A standard filter 12 is arranged below the autoclave 2 and has an inlet 13 on its upper end which is connected to the outlet 5 of the autoclave by a conduit 14. A valve 15 is provided in the conduit 14 to regulate the flow of heated solution from the autoclave 2 to the filter 12.

A steam inlet 16 is provided in the upper end of the filter to permit live steam to be admitted to the filter to maintain the temperature of the solution during the filtering operation.

An outlet 17 is provided in the lower end of the filter through which the monohydrate-free solution flows from the filter. Suitable conduits (not shown) will preferably be connected to this outlet 17 to conduct the discharged solution back to the pickling vats or other source of supply.

A suitable manhole having a door or cover 18 is provided to permit access to the filter 12.

In operation, it is essential to provide a pressure differential between the two sides of the filter in order that the liquid may be forced through the filter and the solid monohydrate recovered.

While we have described a specific method and illustrated one specific form of apparatus for carrying out our method, it will be understood that we do not wish to be limited thereto since various modifications in both the method and apparatus may be made without departing from the invention, as defined in the appended claims.

We claim:

1. The method of recovering iron salts from iron sulfate solutions which consists in providing said solutions with a small amount of free acid, heating said solutions above about 140° F. and then filtering the heated solutions while substantially maintaining their heat to recover ferrous sulfate monohydrate ($FeSO_4H_2O$).

2. The method of recovering iron salts from iron sulfate solutions which consists in providing said solutions with about 0.5 per cent. free acid, heating said solutions above 140° F. under pressure, and then filtering the heated solutions while substantially maintaining their heat to recover ferrous sulfate monohydrate ($FeSO_4H_2O$).

3. The method of recovering iron salts from unkilled waste pickle liquor which consists in heating the waste liquor to above about 140° F. under pressure, then filtering the heated liquor to recover ferrous sulfate monohydrate ($FeSO_4H_2O$).

JOSHUA C. WHETZEL.
RUFUS E. ZIMMERMAN.